US006639489B2

(12) United States Patent

Okuda et al.

(10) Patent No.: US 6,639,489 B2

(45) Date of Patent: Oct. 28, 2003

(54) COMPOSITE HIGH-FREQUENCY SWITCH, HIGH-FREQUENCY MODULE, AND COMMUNICATION APPARATUS

(75) Inventors: Nobuyoshi Okuda, Shiga-ken (JP); Tetsuro Harada, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/170,554

(22) Filed: Jun. 14, 2002

(65) Prior Publication Data

US 2003/0021356 A1 Jan. 30, 2003

(30) Foreign Application Priority Data

Jul. 13, 2001 (JP) ....................................... 2001-213467

(51) Int. Cl.[7] ............................. H01P 1/15; H01P 1/213

(52) U.S. Cl. ....................... 333/104; 333/126; 333/132; 333/134; 333/103; 455/83; 455/82

(58) Field of Search ................................ 333/104, 134, 333/247, 133, 132, 103, 194; 455/83, 82

(56) References Cited

U.S. PATENT DOCUMENTS 5,783,976 A * 7/1998 Furutani et al. ............ 333/104
5,990,732 A * 11/1999 Furutani et al. ............ 333/247
5,999,065 A * 12/1999 Furutani et al. ............ 333/103
6,060,960 A * 5/2000 Tanaka et al. .............. 333/104
6,442,376 B1 * 8/2002 Furutani et al. ............ 333/104
6,445,262 B1 * 9/2002 Tanaka et al. .............. 333/133
6,448,868 B2 * 9/2002 Kato et al. .................. 333/104
6,542,021 B2 * 4/2003 Isono et al. ................. 333/101
6,563,396 B2 * 5/2003 Tanaka et al. .............. 333/133
6,586,786 B2 * 7/2003 Kitazawa et al. ........... 333/103

FOREIGN PATENT DOCUMENTS

JP 11-168303 6/1999

* cited by examiner

*Primary Examiner*—Michael Tokar
*Assistant Examiner*—Lam T. Mai
(74) *Attorney, Agent, or Firm*—Keating & Bennett, LLP

(57) ABSTRACT

A high-frequency module prevents distortion in first and second diodes of a high-frequency switch in a communication system which is not selected without providing a negative power source, and a communication apparatus includes such a high-frequency module. The high-frequency module includes a diplexer having inductors and capacitors, and high-frequency switches including first and second diodes, transmission lines, inductors, and capacitors.

21 Claims, 9 Drawing Sheets

COMPOSITE HIGH-FREQUENCY SWITCH, HIGH-FREQUENCY MODULE, AND COMMUNICATION APPARATUS

BACKGROUND OF THE INVENTION

1. Field of the Invention

The present invention relates to a composite high-frequency switch, a high-frequency module, and a communication apparatus. More particularly, the present invention relates to a composite high-frequency switch, a high-frequency module, and a communication apparatus, which is used in a plurality of different communication systems.

2. Description of the Related Art

Presently, in Europe, as a communication apparatus, a dual-band portable phone which operates in a plurality of communication systems, for example, a DCS (Digital Cellular System) in which a 1.8-GHz band is used and a GSM (Global System for Mobile Communications) in which a 900-MHz band is used has been proposed. In contrast to a conventional portable phone which operates in only one communication system, this dual-band portable phone operates in two communication systems. This enables a user to select and to use a suitable communication system.

In the dual-band portable phone, a high-frequency module is operative to switch between a plurality of communication systems and to switch between a transmission circuit and a receiving circuit. A known high-frequency module is disclosed in Japanese Unexamined Patent Application Publication No. 11-168303. This conventional high-frequency module is defined by an antenna switch module which connects the two communication systems DCS and GSM to an antenna, and includes a diplexer and two high-frequency switches. The two high-frequency switches switch between a transmission circuit and a receiving circuit, and include first and second diodes, a transmission line, and an inductor. The anode of a first diode is connected to the antenna terminal side and its cathode is connected to the transmission terminal side, and an inductor is connected between the cathode and a ground. The transmission line is connected between an antenna terminal and a receiving terminal, and the cathode of a second diode is connected to the receiving terminal side and a capacitor is connected between the anode of the second diode and a ground. A control terminal is connected between the second diode and the capacitor.

When this high-frequency module operates, a positive voltage is applied to the control terminal of the high-frequency switch on the selected communication system side, and a zero voltage is applied to the control terminal of the high-frequency switch on the communication system side which is not selected. However, a problem arises in that a received signal or a transmission signal in the selected communication system side leaks to the communication system side which is not selected, and the first and second diodes of the high-frequency switch of the communication system which is not selected are distorted. To solve this problem, a method in which a negative voltage is applied to the control terminal of the high-frequency switch of the communication system side which is not selected, such that a reverse bias is applied to the first and second diodes of the high-frequency switch of the communication system which is not selected.

However, according to the above-described high-frequency module, since a negative voltage must be applied to the control terminal of the high-frequency switch on the communication system side which is not selected, a negative power source must be provided within the dual-band portable phone, which increases the complexity of the configuration of the circuit.

SUMMARY OF THE INVENTION

In order to overcome the problems described above, preferred embodiments of the present invention provide a composite high-frequency switch and a high-frequency module which prevents distortion in first and second diodes of a communication system which is not selected without providing a negative power source, and a communication apparatus including the high-frequency module.

A first preferred embodiment of the present invention provides a composite high-frequency switch including a plurality of high-frequency switches, each having a first terminal, a second terminal, a first control terminal, a second control terminal, a first diode, a second diode, and a transmission line, wherein the high-frequency switch is configured such that the first terminal, the transmission line, the first diode, and the second terminal are connected in series, the first terminal side of the transmission line is connected to a ground via the second diode, the first control terminal is connected to the ground side of the second diode, and the second control terminal is connected to the second terminal side of the first diode, and at least two of the plurality of high-frequency switches are configured such that the second control terminals are connected to each other and the connection point thereof is connected to a common control terminal via a resistor.

Another preferred embodiment of the present invention provides a composite high-frequency switch including a plurality of high-frequency switches, each having a first terminal, a second terminal, a first control terminal, a second control terminal, a first diode, a second diode, and a transmission line, wherein the high-frequency switch is configured such that the first terminal, the transmission line, the first diode, and the second terminal are connected in series, the first terminal side of the transmission line is connected to a ground via the second diode, the first control terminal is connected to the ground side of the second diode, the second control terminal is connected to the second terminal side of the first diode, and at least two of the plurality of high-frequency switches are configured such that the first control terminals are connected to each other and the connection point thereof is connected to a common control terminal via a resistor.

Still another preferred embodiment of the present invention provides a composite high-frequency switch including a plurality of high-frequency switches each having a first terminal, a second terminal, a first control terminal, a second control terminal, a first diode, a second diode, and a transmission line, wherein the high-frequency switch is configured such that the first terminal, the transmission line, the first diode, and the second terminal are connected in series, the first terminal side of the transmission line is connected to a ground via the second diode, the first control terminal is connected to the ground side of the second diode, the second control terminal is connected to the second terminal side of the first diode, and at least two of the plurality of high-frequency switches are configured such that the first control terminal of a high-frequency switch and the second control terminal of another high-frequency switch are connected to each other and the connection point thereof is connected to a common control terminal via a resistor.

Preferably, the composite high-frequency switch according to preferred embodiments of the present invention further includes a multilayer substrate having a plurality of sheet layers layered thereon, wherein a diode of the high-frequency switch is mounted on the multilayer substrate, and a transmission line of the high-frequency switch is provided in the multilayer substrate.

Another preferred embodiment of the present invention provides a high-frequency module including a diplexer having an inductor and a capacitor, the diplexer being connected to a connection point of the first diode and the transmission line of the high-frequency switch.

Preferably, the high-frequency module according to preferred embodiments of the present invention further includes a multilayer substrate having a plurality of sheet layers layered thereon, wherein a diode of the high-frequency switch is mounted on the multilayer substrate, and the inductor and the capacitor of the diplexer, and a transmission line of the high-frequency switch is provided in the multilayer substrate.

In the high-frequency module, preferably, a capacitor of the diplexer is connected to the ground, and a grounding electrode of the high-frequency switch is provided between the capacitor and the transmission line of the high-frequency switch.

Another preferred embodiment of the present invention provides a communication apparatus using the composite high-frequency switch according to preferred embodiments described above.

Still another preferred embodiment of the present invention provides a communication apparatus using the high-frequency module according to preferred embodiments of the present invention described above.

According to the composite high-frequency switch of various preferred embodiments of the present invention, by applying a positive voltage to the control terminal of a high-frequency switch in a selected communication system side, a forward bias is applied to the first and second diodes of the high-frequency switch on the selected communication system side, and at the same time, a reverse bias is applied to the first and second diodes of a high-frequency switch on the communication system side which is not selected.

According to the high-frequency module of preferred embodiments of the present invention, since a composite high-frequency switch having greatly improved distortion characteristics is provided, the distortion characteristics of the high-frequency module are also greatly improved.

According to the communication apparatus of preferred embodiments of the present invention, since a composite high-frequency switch or a high-frequency module, having greatly improved distortion characteristics, is provided, the transmission and receiving characteristics of the communication apparatus are greatly improved.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

The preferred embodiments of the present invention will be described below with reference to the drawings.

Figure 1:
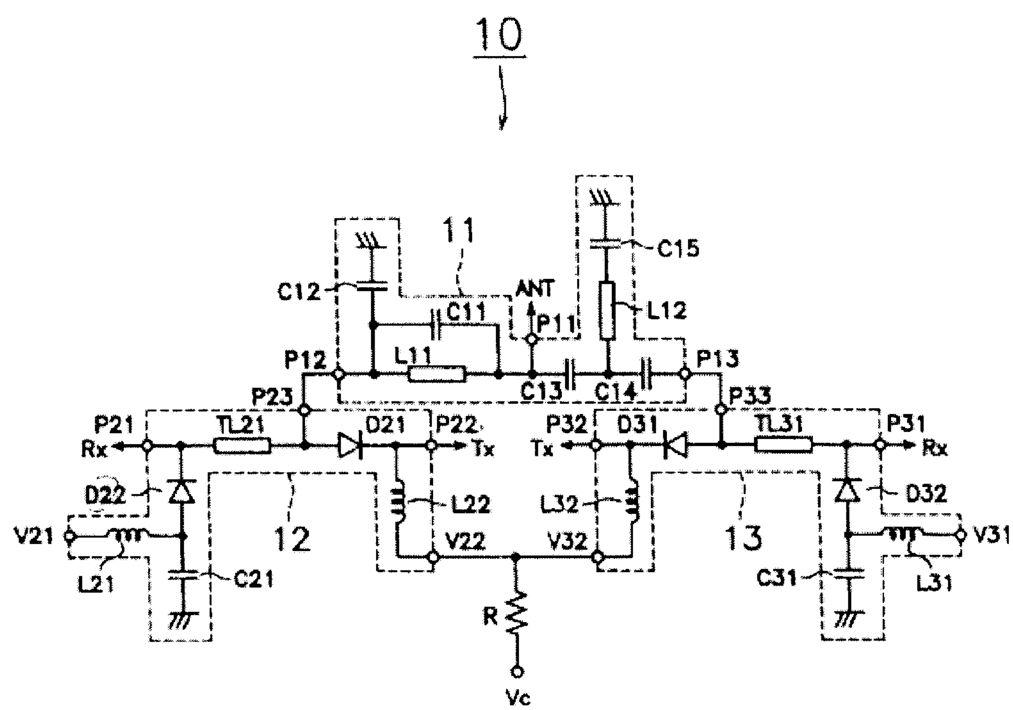
FIG. 1 is a circuit diagram of a first preferred embodiment of a high-frequency module according to the present invention.

FIG. 1 is a circuit diagram of a first preferred embodiment of a high-frequency module according to the present invention. A high-frequency module 10 includes a diplexer 11, and high-frequency switches 12 and 13.

The diplexer 11 includes inductors L11 and L12 and capacitors C11 to C15. A parallel circuit including the inductor L11 and the capacitor C11 is connected between a first terminal P11 and a second terminal P12, and a second terminal P12 side of the parallel circuit is connected to a ground via the capacitor C12.

Furthermore, the capacitors C13 and C14 are connected in series between the first terminal P11 and a third terminal P13, and a connection point thereof is connected to a ground via the inductor L12 and the capacitor C15.

The high-frequency switch 12 includes first and second diodes D21 and D22, a transmission line TL21, inductors L21 and L22, and a capacitor C21. The first diode D21, the transmission line TL21, the first diode D21, and the second terminal P22 are connected in series. Furthermore, the first terminal P21 side of the transmission line TL21 is connected to a ground via the second diode D22 and the capacitor C21, and a first control terminal V21 is connected to the ground side of the second diode D22, that is, the anode thereof, via the inductor L21.

Furthermore, a second control terminal V22 is connected to the second terminal P22 side of the first diode D21, that is, the cathode thereof, via the inductor L22. A third terminal P23 is provided between the transmission line TL21 and the first diode D21.

The high-frequency switch 13 includes first and second diodes D31 and D32, a transmission line TL31, inductors L31 and L32, and a capacitor C31. The structure of the high-frequency switch 13 is the same as that of the high-frequency switch 12.

The second control terminal V22 of the high-frequency switch 12 and a second control terminal V32 of the high-frequency switch 13 are connected to each other, and a connection point thereof is connected to a common control terminal Vc via a resistor R.

In the above-described construction, an antenna ANT is connected to the first terminal P11 of the diplexer 11, the third terminal P23 of the high-frequency switch 12 is connected to the second terminal P12, and a third terminal P33 of the high-frequency switch 13 is connected to the third terminal P13. Furthermore, a receiving circuit Rx is connected to the first terminal P21 of the high-frequency switch 12 and a first terminal P31 of the high-frequency switch 13, and a transmission circuit Tx is connected to the second terminal P22 of the high-frequency switch 12 and a second terminal P32 of the high-frequency switch 13.

The operation of the high-frequency module 10 having the circuit configuration of FIG. 1 will now be described. When a communication system on the high-frequency switch 12 side is to be selected, that is, when the high-frequency switch 12 is to be turned on, approximately 3 V is applied to the first control terminal V21 of the high-frequency switch 12, 0 V is applied to the first control terminal V31 of the high-frequency switch 13, and approximately 0.5 V is applied to the common control terminal Vc.

Just then, a forward bias is applied to the first and second diodes D21 and D22 of the high-frequency switch 12 on the selected communication system side, and forward current flows from the first control terminal V21 of the high-frequency switch 12 toward the common control terminal Vc. Then, since a voltage drop occurs in the resistor R due to this forward current, the amount of the voltage drop is applied as a reverse bias to the first and second diodes D31 and D32 of the high-frequency switch 13. This reverse bias causes the off capacity of the first and second diodes D31 and D32 of the high-frequency switch 13 on the communication system side which is not selected to be stabilized and decreased. As a consequence, the distortion characteristics are greatly improved.

Furthermore, since an inductor is inserted at a stage that precedes the resistor, the inductor shields a high-frequency signal.

Figure 2:
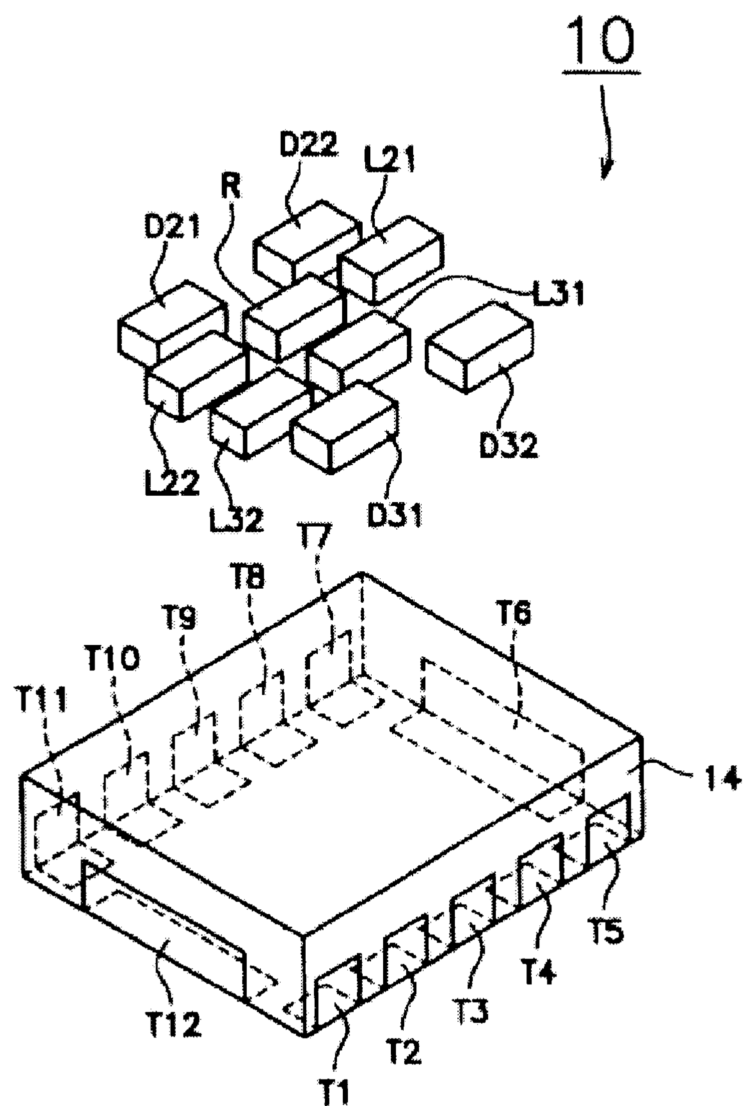
FIG. 2 is a partially exploded perspective view showing a specific construction of the high-frequency module of FIG. 1.
Figure 3A:
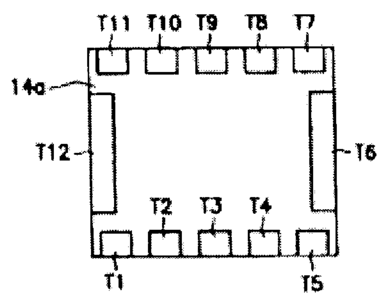
FIGS. 3A, 3B, 3C, 3D, 3E, 3F, 3G, 3H, 3I, and 3J are top views of first to tenth sheet layers which define the high-frequency module of FIG. 2.
Figure 3B:
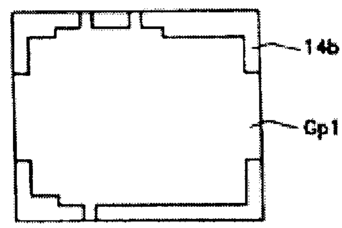
Figure 3C:
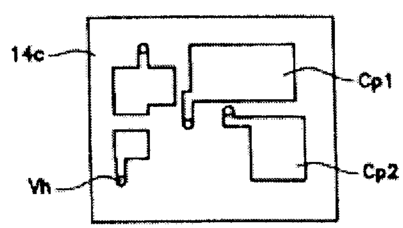
Figure 3D:
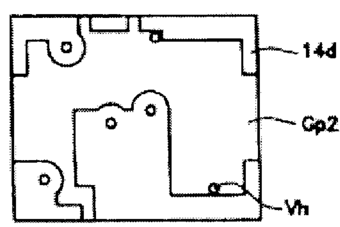
Figure 3E:
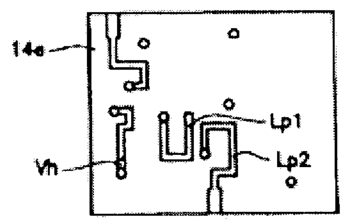
Figure 3F:
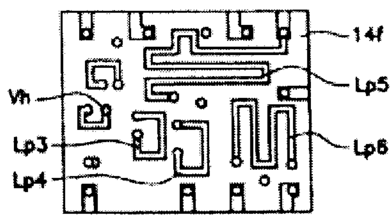
Figure 3G:
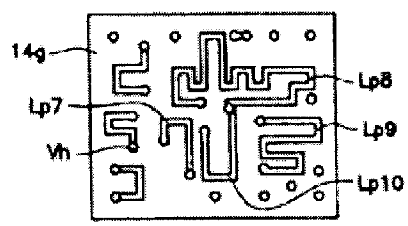
Figure 3H:
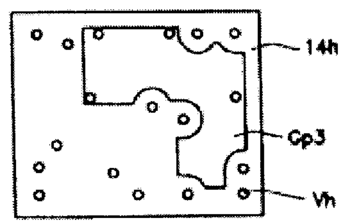
Figure 3I:
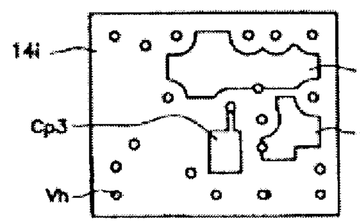
Figure 3J:
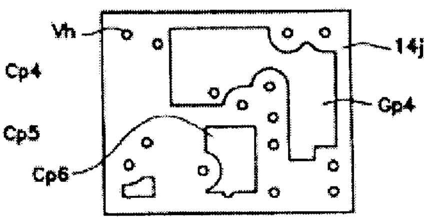

FIG. 2 is a partially exploded perspective view showing the specific structure of the high-frequency module shown in FIG. 1. The high-frequency module 10 includes a multilayer substrate 14. Although not shown, inductors L11 and L12 and capacitors C11 to C15 which define the diplexer 11 (FIG. 1), and, transmission lines TL21 and TL31 and capacitor C21 and C31 which define the high-frequency switches 12 and 13 (FIG. 1), respectively, are provided in the multilayer substrate 14.

The first and second diodes D21, D22, D31, and D32, and the inductors L21, L22, L31, and L32, which define the high-frequency switches 12 and 13 (FIG. 1) defined by chip components, and the resistor R, are mounted on the surface of the multilayer substrate 14.

Furthermore, 12 external terminals T1 to T12 are preferably formed by screen printing, or other suitable methods, so as to extend from the side surfaces of the multilayer substrate 14 toward the bottom. The external terminal T1 defines a second terminal P32 of the high-frequency switch 13. The external terminal T3 defines a first terminal P11 of the diplexer 11. The external terminal T4 defines a first control terminal V31 of the high-frequency switch 13. The external terminal T5 defines a first terminal P31 of the high-frequency switch 13. The external terminal T7 defines a first terminal P21 of the high-frequency switch 12. The external terminal T8 defines a first control terminal V21 of the high-frequency switch 12. The external terminal T11 defines a second terminal P22 of the high-frequency switch 12. The external terminals T2, T6, T9, T10, and T12 define grounding terminals.

The second terminal P12 of the diplexer 11 and the third terminal P23 of the high-frequency switch 12, and the third terminal P13 of the diplexer 11 and the third terminal P33 of the high-frequency switch 13 are connected to each other through via holes provided in the multilayer substrate 14.

Figure 4A:
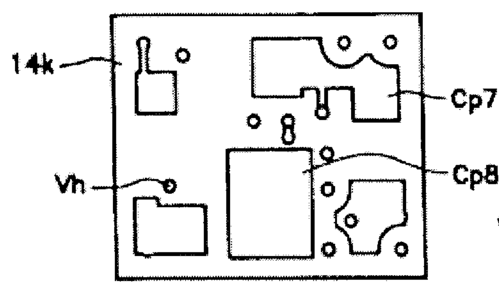
FIGS. 4A, 4B, 4C, 4D, 4E, and 4F are top views of eleventh to sixteenth sheet layers which define the high-frequency module of FIG. 2.
Figure 4B:
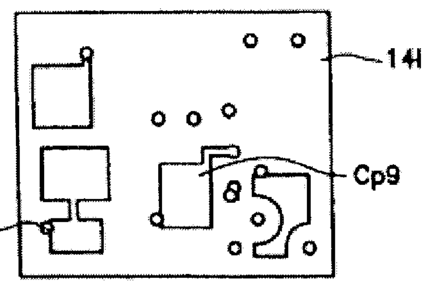
Figure 4C:
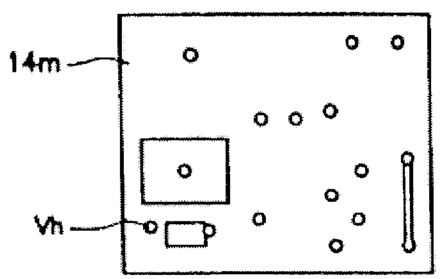
Figure 4D:
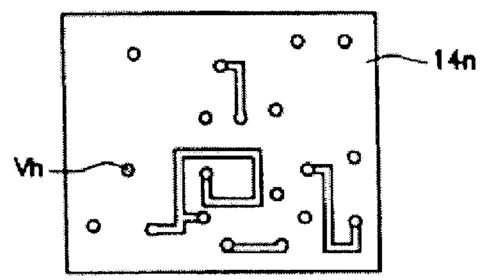
Figure 4E:
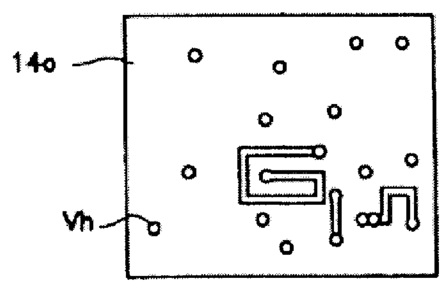
Figure 4F:
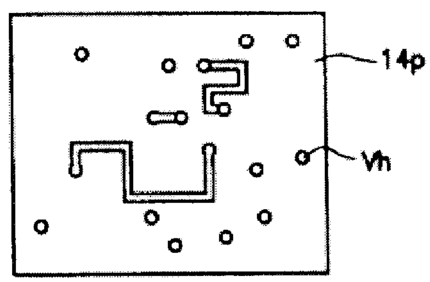
Figure 4G:
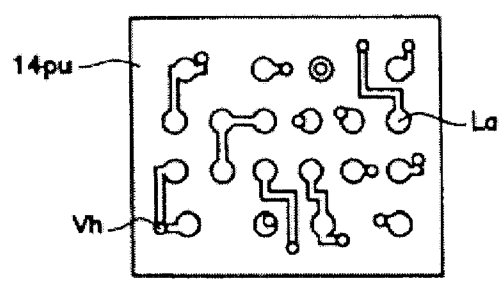
FIG. 4G is a bottom view of the sixteenth sheet layer.

FIGS. 3A to 3J, and FIGS. 4A to 4F are top views of each sheet layer defining a multilayer substrate of the high-frequency module of FIG. 2. FIG. 4G is a bottom view of the sheet layer of FIG. 4F. A multilayer substrate 14 is formed by sequentially layering, from the top, first to sixteenth sheet layers 14*a* and 14*p* made of ceramics, in which barium oxide, aluminum oxide, and silica are main ingredients, and by firing these sheet layers at a firing temperature of about 1000° C. or lower, after which these are turned upside down. That is, the sixteenth sheet layer 14*p* becomes the topmost layer of the multilayer substrate 14, and the first sheet layers 14*a* becomes the bottommost layer of the multilayer substrate 14.

The external terminals T1 to T12 are provided on the surface of the first sheet layer 14*a*. Grounding electrodes Gp1 to Gp4 are formed by screen printing, or other suitable method, on the surfaces of the second, fourth, eighth, and tenth sheet layers 14*b*, 14*d*, 14*h*, and 14*j*.

Capacitor electrodes Cp1 to Cp9 are formed by screen printing, or other suitable method, on the surfaces of the third sheet layers 14*c*, and ninth to twelfth sheet layers 14*i* to 14*l*. Furthermore, stripline electrodes Lp1 to Lp10 are formed by screen printing, or other suitable method, on the surfaces of the fifth to seventh sheet layers 14*e* to 14*g*.

Mounting electrodes La for mounting the first and second diodes D21, D22, D31, and D32, and the inductors L21, L22, L31, and L32, which define the high-frequency switches 12 and 13 (FIG. 1), and the resistor R are provided on the bottom surface (FIG. 4G, 14*pu*) of the sixteenth sheet layer. Furthermore, a plurality of via hole electrodes Vh are provided on the second to sixteenth sheet layers 14*b* to 14*p* so as to extend through each of the sheet layers 14*b* to 14*p*.

At this time, the inductor L11 of the diplexer 11 is defined by the stripline electrodes Lp2, Lp4, and Lp10. The inductor L12 of the diplexer 11 is defined by the stripline electrodes Lp1, Lp3, and Lp7. The transmission line TL21 of the high-frequency switch 12 is defined by the stripline electrodes Sp5 and Sp8. The transmission line TL31 of the high-frequency switch 13 is defined by the stripline electrodes Sp6 and Sp9.

In addition, the capacitor C11 of the diplexer 11 is defined by the capacitor electrodes Cp3 and Cp6. The capacitor C12 of the diplexer 11 is defined by the capacitor electrode Cp2 and the grounding electrodes Gp1 and Gp2. The capacitor C13 of the diplexer 11 is defined by the capacitor electrodes Cp6 and Cp8. The capacitor C14 of the diplexer 11 is defined by the capacitor electrodes Cp8 and Cp9. The capacitor C15 of the diplexer 11 is defined by the capacitor electrode Cp1 and the grounding electrodes Gp1 and Gp2.

The capacitor C21 of the high-frequency switch 12 is defined by the capacitor electrode Cp7 and the grounding electrode Gp4. The capacitor C31 of the high-frequency switch 13 is defined by the capacitor electrode Cp5 and the grounding electrodes Gp3 and Gp4.

Figure 5:
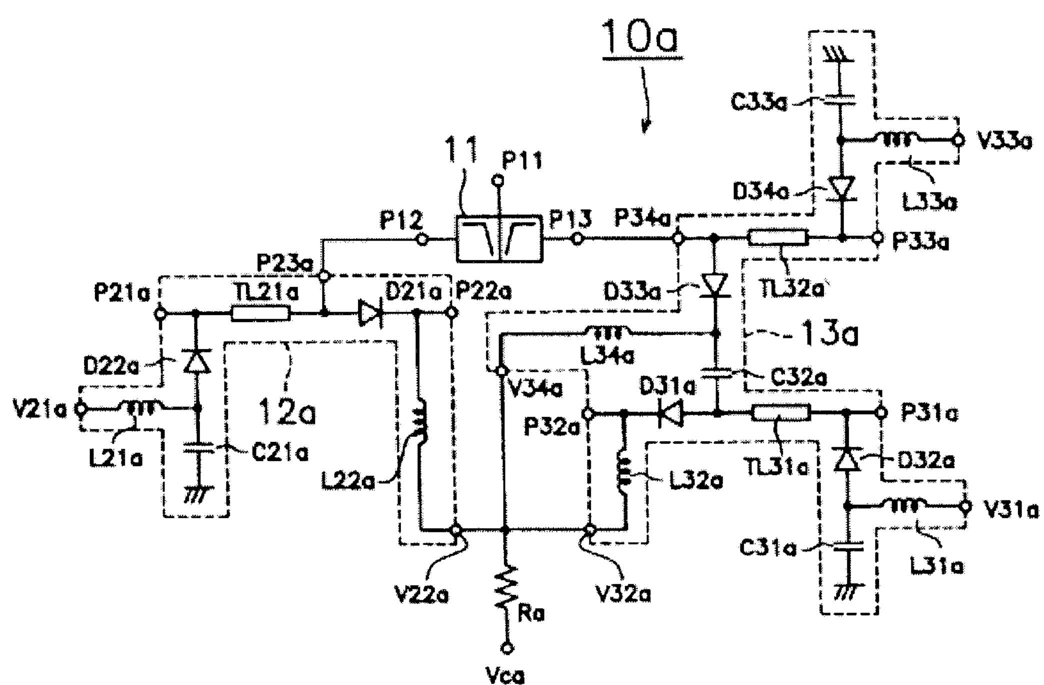
FIG. 5 is a circuit diagram showing a modification of the high-frequency module of FIG. 1.

FIG. 5 is a circuit diagram showing a modification of the high-frequency module of FIG. 1. A high-frequency module 10*a* is designed for a triple band and includes the diplexer 11 and the high-frequency switches 12*a* and 13*a*. The structure of the diplexer 11 is preferably the same as that of the high-frequency module 10 (FIG. 1) of the first preferred embodiment, and accordingly, a description thereof is omitted.

The high-frequency switch 12*a* includes first and second diodes Da21*a* and D22*a*, a transmission line TL21*a*, inductors L21*a* and L22*a*, and a capacitor C21*a*. A first terminal P21*a*, a transmission line TL21*a*, the first diode D21*a*, and a second terminal P22*a* are connected in series.

Furthermore, the first terminal P21*a* side of the transmission line TL21*a* is connected to a ground via the second diode D22*a* and the capacitor C21*a*, and a first control terminal V21*a* is connected to the ground side of the second diode D22*a*, that is, the anode thereof, via the inductor L21*a*.

In addition, a second control terminal V22*a* is connected to the second terminal P22*a* side of the first diode D21*a*, that is, the cathode thereof, via the inductor L22*a*. Furthermore, a third terminal P23*a* is provided between the transmission line TL21*a* and the first diode D21*a*.

The high-frequency switch 13*a* includes first to fourth diodes D31*a* to D34*a*, transmission lines TL31 and TL32*a*, inductors L31*a* to L33*a*, and capacitors C31*a* to C33*a*. A first terminal P31*a*, the transmission line TL31*a*, the first diode D31*a*, and a second terminal P32*a* are connected in series.

The first terminal P31*a* side of the transmission line TL31*a* is connected to a ground via the second diode D32*a* and the capacitor C31*a*, and a first control terminal V31*a* is connected to the ground side of the second diode D32*a*, that is, the anode thereof, via the inductor L31*a*.

In addition, a second control terminal V32*a* is connected to the second terminal P32*a* side of the first diode D31*a*, that is, the cathode thereof, via the inductor L32*a*. Furthermore, the capacitor C32*a*, the third diode D33*a*, the transmission line TL32*a*, and the third terminal P33*a* are connected in series to the connection point of the transmission line TL31*a* and the first diode D31*a*.

Furthermore, the third terminal P33*a* side of the transmission line TL32*a* is connected to a ground via a fourth diode D34*a* and a capacitor C33*a*, and a third control terminal V33*a* is connected to the ground side of the fourth diode D34*a*, that is, the anode thereof, via an inductor L33*a*.

In addition, a fourth terminal P34*a* is provided between the third diode D33*a* and the transmission line TL32*a*, and a fourth control terminal V34*a* is connected between the capacitor C32*a* and the third diode D33*a* via the inductor L34*a*.

The second control terminals V22*a* and V32*a* of the high-frequency switches 12*a* and 13*a*, and the fourth control terminal V34*a* of the high-frequency switch 13*a* are connected to each other, and a connection point thereof is connected to a common control terminal Vca via a resistor Ra.

In the above-described configuration, the third terminal P23*a* of the high-frequency switch 12*a* is connected to the second terminal P12 of the diplexer 11, and the fourth terminal P34*a* of the high-frequency switch 13*a* is connected to the third terminal P13. Although not shown, an antenna ANT is connected to the first terminal P11 of the diplexer 11. A receiving circuit Rx is connected to the first terminals P21*a* and P31*a* of the high-frequency switches 12*a* and 13*a*. A transmission circuit Tx is connected to the second terminals P22*a* and P32*a* of the high-frequency switches 12*a* and 13*a*. Both the receiving circuit Rx and the transmission circuit Tx are connected to the third terminal P33*a* of the high-frequency switch 13*a*.

Here, the operation of the high-frequency module 10*a* having the circuit configuration of FIG. 5 is described. When the communication system on the high-frequency switch 12*a* side is to be selected, that is, when the high-frequency switch 12*a* is to be turned on, approximately 3 V is applied to the first control terminal V21*a* of the high-frequency switch 12*a*, 0 V is applied to the first control terminal V31*a* of the high-frequency switch 13*a*, and approximately 0.5 V is applied to the common control terminal Vca.

Just then, a forward bias is applied to the first and second diodes D21*a* and D22*a* of the high-frequency switch 12*a* on the selected communication system side, and forward current flows from the first control terminal V21*a* of the high-frequency switch 12*a* toward the common control terminal Vca. Then, since a voltage drop occurs in the resistor Ra due to this forward current, the amount of the voltage drop is applied as a reverse bias to the first to fourth diodes D31*a* to D34*a* of the high-frequency switch 13*a*. This reverse bias causes the off capacity of the first to fourth diodes D31*a* to D34*a* of the high-frequency switch 13*a* on the communication system side which is not selected to be stabilized and decreased. As a consequence, the distortion characteristics are greatly improved.

Figure 6:
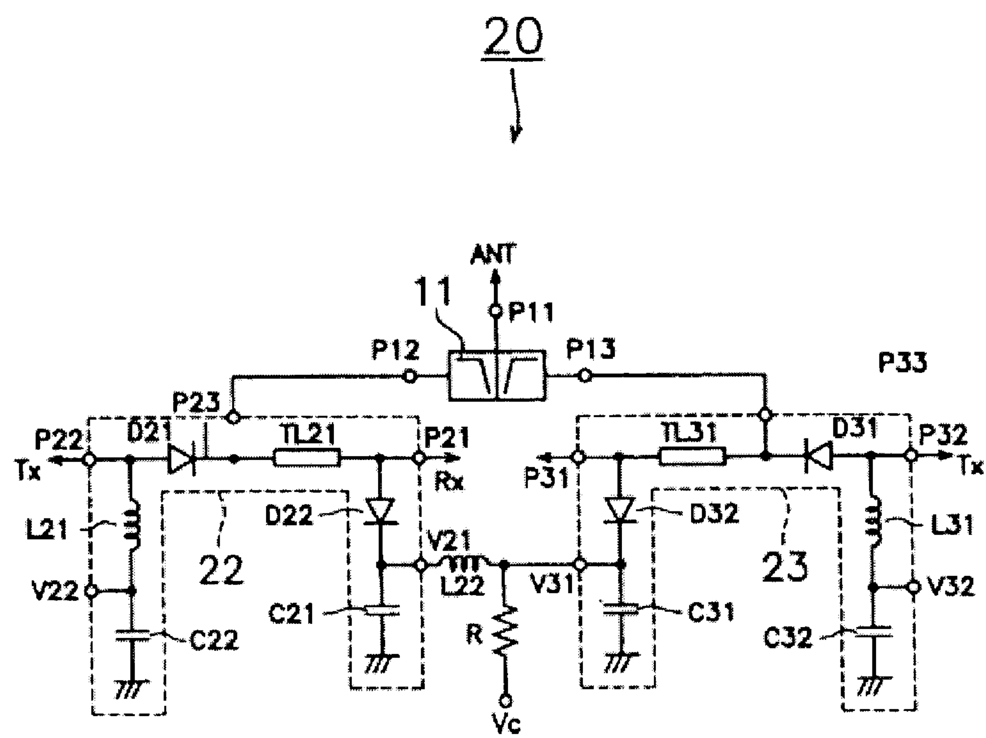
FIG. 6 is a circuit diagram of a second preferred embodiment of a high-frequency module according to the present invention.

FIG. 6 is a circuit diagram of a second preferred embodiment of a high-frequency module according to the present invention. A high-frequency module 20 includes a diplexer 11 and high-frequency switches 22 and 23. The structure of the diplexer 11 is preferably the same as that of the high-frequency module 10 (FIG. 1) of the first preferred embodiment, and accordingly, a description thereof is omitted.

The high-frequency switch 22 includes first and second diodes D21 and D22, a transmission line TL21, inductors L21 and L22, and capacitors C21 and c22. A first terminal P21, the transmission line TL21, the first diode D21, and a second terminal P22 are connected in series. Furthermore, the first terminal P21 side of the transmission line TL21 is connected to a ground via the second diode D22 and the capacitor C21, and a first control terminal V21 is connected to the ground side of the second diode D22, that is, the anode thereof, via the second diode D22 and the capacitor C21.

The second terminal P22*a* side of the first diode D21*a*, that is, the anode thereof, is connected to the ground via the inductor L21 and the capacitor C22, and a second control terminal V22 is connected to the ground side of the inductor L21. Furthermore, a third terminal P23 is provided between the transmission line TL21 and the first diode D21.

The high-frequency switch 23 includes first and second diodes D31 and D32, a transmission line TL31, an inductor L31, and capacitors C31 and C32. The structure of the high-frequency switch 23 is the same as that of the high-frequency switch 22.

The first control terminals V21 and V31 of the high-frequency switches 22 and 23 are connected to each other, and a connection point thereof is connected to a common control terminal Vc via a resistor R. The inductor L22 is connected between the first control terminal V21 of the high-frequency switch 22 and the resistor R. However, the inductor may not be connected.

Here, the operation of the high-frequency module 20 having the circuit configuration of FIG. 6 is described. When the communication system on the high-frequency switch 22 side is to be selected, that is, when the high-frequency switch 22 is to be turned on, approximately 3 V is applied to the first control terminal V22 of the high-frequency switch 22, 0 V is applied to the first control terminal V32 of the high-frequency switch 23, and approximately 0.5 V is applied to the common control terminal Vc.

Just then, a forward bias is applied to the first and second diodes D21 and D22 of the high-frequency switch 22 on the selected communication system side, and forward current flows from the second control terminal V22 of the high-frequency switch 22 toward the common control terminal Vc. Then, since a voltage drop occurs in the resistor R due to this forward current, the amount of the voltage drop is applied as a reverse bias to the first and second diodes D31 and D32 of the high-frequency switch 23. This reverse bias causes the off capacity of the first and second diodes D31 and D32 of the high-frequency switch 23 on the communication system side which is not selected to be stabilized and decreased. As a consequence, the distortion characteristics are greatly improved.

Figure 7:
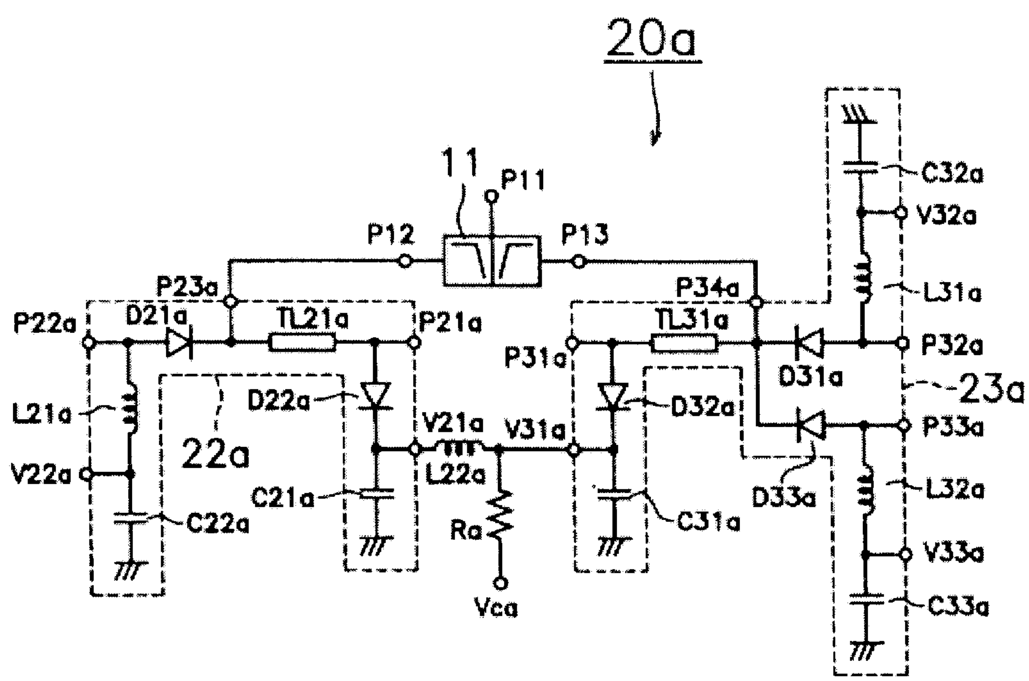
FIG. 7 is a circuit diagram showing a modification of the high-frequency module of FIG. 3.

FIG. 7 is a circuit diagram showing a modification of the high-frequency module of FIG. 6. A high-frequency module 20*a* is designed for a triple band and is defined by the diplexer 11 and the high-frequency switches 22*a* and 23*a*. The structure of the diplexer 11 is the same as that of the high-frequency module 10 (FIG. 1) of the first preferred embodiment, and accordingly, a description thereof is omitted.

The high-frequency switch 22*a* includes first and second diodes D21*a* and D22*a,* a transmission line TL21*a,* an inductor L21*a,* and capacitors C21*a* and C22*a*. A first terminal P21*a,* the transmission line TL21*a,* the first diode D21*a,* and a second terminal P22*a* are connected in series. Furthermore, the first terminal P21*a* side of the transmission line TL21*a* is connected to a ground via the second diode D22*a* and the capacitor C21*a,* and a first control terminal V21*a* is connected to the ground side of the second diode D22*a,* that is, the cathode thereof.

Furthermore, the second terminal P22*a* side of the first diode D21*a,* that is, the anode thereof, is connected to a ground via the inductor L21*a* and the capacitor C22*a,* and a second control terminal V22*a* is connected to the ground side of the inductor L21*a*. Furthermore, a third terminal P23*a* is provided between the transmission line TL21*a* and the first diode D21*a*.

The high-frequency switch 23*a* includes first to third diodes D31*a* to D33*a,* a transmission line TL31*a,* inductors L31*a* and L32*a,* and capacitors C31*a* to C33*a*. A first terminal P31*a,* the transmission line TL31*a,* the first diode D31*a,* and a second terminal P32*a* are connected in series.

Furthermore, the first terminal P31*a* side of the transmission line TL31*a* is connected to a ground via the second diode D32*a* and the capacitor C31*a,* and a first control terminal V31*a* is connected to the ground side of the second diode D32*a,* that is, the cathode thereof.

In addition, the second terminal P32*a* side of the first diode D31*a,* that is, the anode thereof, is connected to a ground via an inductor L31*a* and the capacitor C32*a,* and a second control terminal V32*a* is connected to the ground side of the inductor L31*a*. Furthermore, a third diode D33*a* and a third terminal P33*a* are connected in series to a connection point of the transmission line TL31*a* and the second diode D31*a*.

In addition, the third terminal P33*a* side of the third diode D33*a,* that is, the anode thereof, is connected to a ground via an inductor L32*a* and the capacitor C33*a,* and a third control terminal V33*a* is connected to the ground side of the inductor L32*a*. Furthermore, a fourth terminal P34*a* is provided between the transmission line TL31*a* and the first diode D31*a*.

The first control terminals V21*a* and V31*a* of the high-frequency switches 22*a* and 23*a* are connected to each other, and a connection point thereof is connected to a common control terminal Vca via a resistor Ra. The inductor L22*a* is connected between the first control terminal V21*a* of the high-frequency switch 22*a* and the resistor Ra. However, the inductor L22*a* may not be connected.

In the above-described configuration, the third terminal P23*a* of the high-frequency switch 22*a* is connected to the second terminal P12 of the diplexer 11, and the fourth terminal P34*a* of the high-frequency switch 23*a* is connected to the third terminal P23. Although not shown, an antenna ANT is connected to the first terminal P11 of the diplexer 11. A receiving circuit Rx is connected to the first terminals P21*a* and P31*a* of the high-frequency switches 22*a* and 23*a*. A transmission circuit Tx is connected to the second terminals P22*a* and P32*a* of the high-frequency switches 22*a* and 23*a*. Both the receiving circuit Rx and the transmission circuit Tx are connected to the third terminal P33*a* of the high-frequency switch 23*a*.

The operation of the high-frequency module 20*a* having the circuit configuration of FIG. 7 will now be described. When the communication system on the high-frequency switch 22*a* side is to be selected, that is, when the high-frequency switch 22*a* is to be turned on, approximately 3 V is applied to the second control terminal V22*a* of the high-frequency switch 22*a,* 0 V is applied to the second control terminal V32*a* of the high-frequency switch 23*a,* and approximately 0.5 V is applied to the common control terminal Vca.

Just then, a forward bias is applied to the first and second diodes D21*a* and D22*a* of the high-frequency switch 22*a* on the selected communication system side, and forward current flows from the second control terminal V22*a* of the high-frequency switch 22*a* toward the common control terminal Vca. Then, since a voltage drop occurs in the resistor Ra due to this forward current, the amount of the voltage drop is applied as a reverse bias to the first to third diodes D31*a* to D33*a* of the high-frequency switch 23*a*. This reverse bias causes the off capacity of the first to third diodes D31*a* to D33*a* of the high-frequency switch 23*a* on the communication system side which is not selected to be stabilized and decreased. As a consequence, the distortion characteristics are greatly improved.

Figure 8:
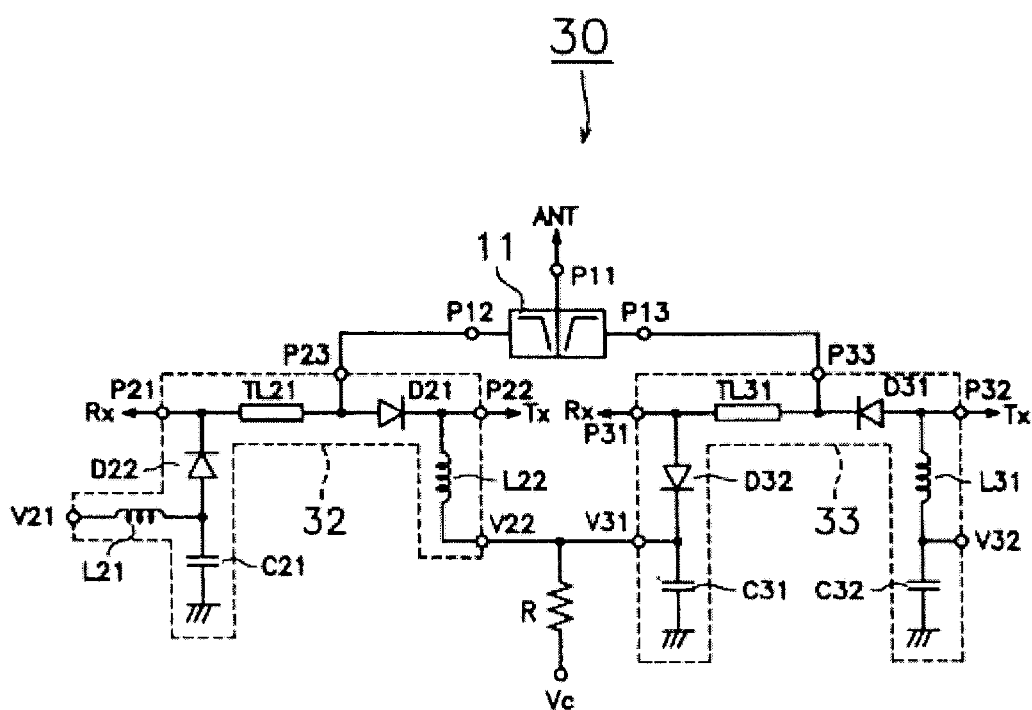
FIG. 8 is a circuit diagram of a third preferred embodiment of a high-frequency module according to the present invention.

FIG. 8 is a circuit diagram of a third preferred embodiment of a high-frequency module according to the present invention. A high-frequency module 30 includes a diplexer 11, and high-frequency switches 32 and 33. The structure of the diplexer 11 is preferably the same as that of the high-frequency module 10 (FIG. 1) of the first preferred embodiment, and accordingly, a description thereof is omitted.

The high-frequency switch 32 includes first and second diodes D21 and D22, a transmission line TL21, inductors L21 and L22, and a capacitor C21. A first terminal P21, the transmission line TL21, the first diode D21, and a second terminal P22 are connected in series. Furthermore, the first terminal P21 side of the transmission line TL21 is connected to a ground via the second diode D22 and the capacitor C21, and a first control terminal V21 is connected to the ground side of the second diode D22, that is, the anode thereof, via the inductor L21.

A second control terminal V22 is connected to the second terminal P22 side of the first diode D21, that is, the cathode thereof, via the inductor L22. Furthermore, a third terminal P23 is provided between the transmission line TL21 and the first diode D21.

The high-frequency switch 33 includes first and second diodes D31 and D32, a transmission line TL31, an inductor L31, and capacitors C31 and C32. A first terminal P31, the transmission line TL31, the first diode D31, and a second terminal P32 are connected in series. The first terminal P31 side of the transmission line TL31 is connected to a ground via the second diode D32 and the capacitor C31, and a first control terminal V31 is connected to the ground side of the second diode D32, that is, the cathode thereof.

The second terminal P32 side of the first diode D31, that is, the anode thereof, is connected to a ground via an inductor L31 and the capacitor C32, and a second control terminal V32 is connected to the ground side of the inductor L31. Furthermore, a third terminal P33 is provided between the transmission line TL31 and the first diode D31.

The second control terminal V22 of the high-frequency switch 32 and the first control terminal V31 of the high-frequency switch 33 are connected to each other, and a connection point thereof is connected to the common control terminal Vc via a resistor R.

The operation of the high-frequency module 30 having the circuit configuration of FIG. 8 will now be described. When the communication system on the high-frequency switch 32*a* side is to be selected, that is, when the high-frequency switch 32 is to be turned on, approximately 3 V is applied to the first control terminal V21 of the high-frequency switch 32, 0 V is applied to the second control terminal V32 of the high-frequency switch 33, and approximately 0.5 V is applied to the common control terminal Vc.

Just then, a forward bias is applied to the first and second diodes D21 and D22 of the high-frequency switch 32 on the selected communication system side, and forward current flows from the first control terminal V21 of the high-frequency switch 32 toward the common control terminal Vc. Then, since a voltage drop occurs in the resistor R due to this forward current, the amount of the voltage drop is applied as a reverse bias to the first and second diodes D31 and D32 of the high-frequency switch 33. This reverse bias causes the off capacity of the first and second diodes D31 and D32 of the high-frequency switch 33 on the communication system side which is not selected to be stabilized and decreased. As a consequence, the distortion characteristics are greatly improved.

Figure 9:
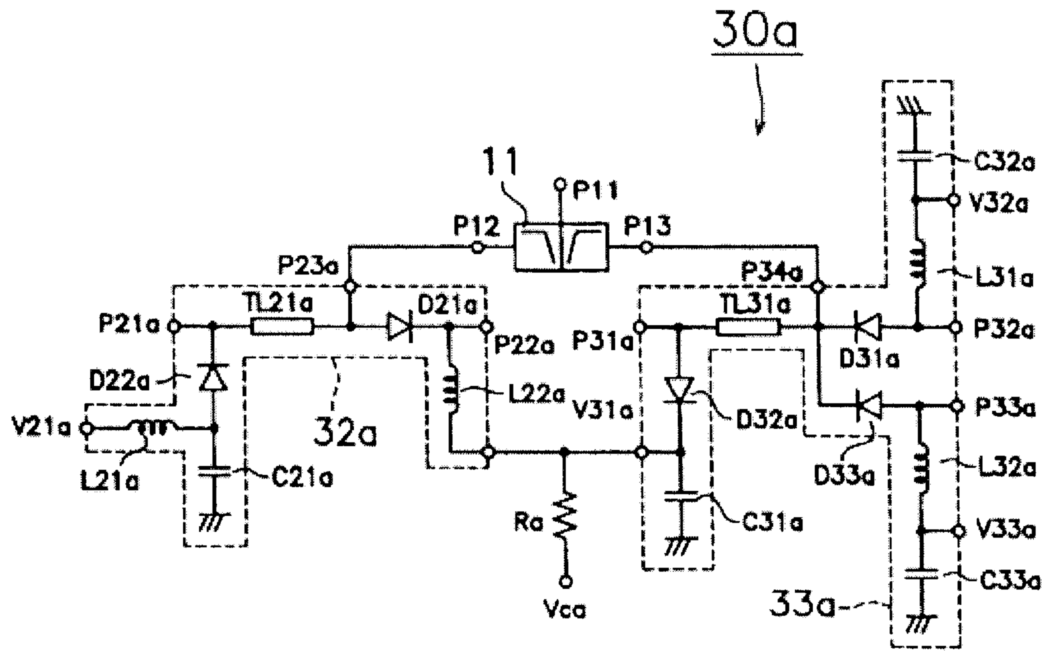
FIG. 9 is a circuit diagram showing a modification of the high-frequency module of FIG. 5.

FIG. 9 is a circuit diagram showing a modification of the high-frequency module of FIG. 8. A high-frequency module 30*a* is designed for a triple band and includes the diplexer 11 and the high-frequency switches 32*a* and 33*a*. The structure of the diplexer 11 is preferably the same as that of the high-frequency module 10 (FIG. 1) of the first preferred embodiment, and accordingly, a description thereof is omitted.

The high-frequency switch 32*a* includes first and second diodes D21*a* and D22*a,* a transmission line TL21*a,* inductors L21*a* and L22*a,* and a capacitor C21*a*. A first terminal P21*a,* the transmission line TL21*a,* the first diode D21*a,* and a second terminal P22*a* are connected in series.

Furthermore, the first terminal P21*a* side of the transmission line TL21*a* is connected to a ground via the second diode D22 and the capacitor C21*a,* and a first control terminal V21*a* is connected to the ground side of the second diode D22*a,* that is, the anode thereof, via the inductor L21*a*.

Furthermore, a second control terminal V22*a* is connected to the second terminal P22*a* side of the first diode D21*a,* that is, the cathode thereof. Furthermore, a third terminal P23*a* is provided between the transmission line TL21*a* and the first diode D21*a*.

The high-frequency switch 33*a* includes first to third diodes D31*a* to D33*a,* a transmission line TL31*a,* inductors L31*a* and L32*a,* and capacitors C31*a* to C33*a*. A first terminal P31*a,* the transmission line TL31*a,* the first diode D31*a,* and a second terminal P32*a* are connected in series.

Furthermore, the first terminal P31*a* side of the transmission line TL31*a* is connected to a ground via the second diode D32*a* and the capacitor C31*a,* and a first control terminal V31*a* is connected to the ground side of the second diode D32*a,* that is, the cathode thereof.

Furthermore, the second terminal P32*a* side of the first diode D31*a,* that is, the anode thereof, is connected to a ground via an inductor L31*a* and the capacitor C32*a,* and a second control terminal V32*a* is connected to the ground side of the inductor L31*a*. Furthermore, a third diode D33*a* and a third terminal P33*a* are connected in series to a connection point of the transmission line TL31*a* and the first diode D31*a*.

In addition, the third terminal P33*a* side of the third diode D33*a,* that is, the anode thereof, is connected to a ground via an inductor L32*a* and the capacitor C33*a,* and a third control terminal V33*a* is connected to the ground side of the inductor L32*a*. Furthermore, a fourth terminal P34*a* is provided between the transmission line TL31*a* and the first diode D31*a*.

The second control terminals V22*a* of the high-frequency switches 32*a* and the first control terminal V31*a* of the high-frequency switch 33*a* are connected to each other, and a connection point thereof is connected to a common control terminal Vca via a resistor Ra.

In the above-described configuration, the third terminal P23*a* of the high-frequency switch 32*a* is connected to the second terminal P12 of the diplexer 11, and the fourth terminal P34*a* of the high-frequency switch 33*a* is connected to the third terminal P13. Although not shown, an antenna ANT is connected to the first terminal P11 of the diplexer 11. A receiving circuit Rx is connected to the first terminals P21*a* and P31*a* of the high-frequency switches 32*a* and 33*a*. A transmission circuit Tx is connected to the second terminals P22*a* and P32*a* of the high-frequency switches 32*a* and 33*a*. Both the receiving circuit Rx and the transmission circuit Tx are connected to the third terminal P33*a* of the high-frequency switch 33*a*.

The operation of the high-frequency module 30*a* having the circuit configuration of FIG. 9 will now be described. When the communication system on the high-frequency switch 32*a* side is to be selected, that is, when the high-frequency switch 32*a* is to be turned on, approximately 3 V is applied to the first control terminal V21*a* of the high-frequency switch 32*a,* 0 V is applied to the first control terminal V31*a* of the high-frequency switch 33*a,* and approximately 0.5 V is applied to the common control terminal Vca.

Just then, a forward bias is applied to the first and second diodes D21*a* and D22*a* of the high-frequency switch 32*a* on the selected communication system side, and forward current flows from the first control terminal V21*a* of the high-frequency switch 32*a* toward the common control terminal Vca. Then, since a voltage drop occurs in the resistor Ra due to this forward current, the amount of the voltage drop is applied as a reverse bias to the first to fourth diodes D31*a* to D34*a* of the high-frequency switch 33*a*. This reverse bias causes the off capacity of the first to fourth diodes D31*a* to D34*a* of the high-frequency switch 33*a* on the communication system side which is not selected to be stabilized and decreased. As a consequence, the distortion characteristics are greatly improved.

According to the high-frequency module of the above-described preferred embodiments, by applying a positive voltage to the control terminal of a high-frequency switch on the selected communication system side, a forward bias is applied to the first and second diodes of the high-frequency switch on the selected communication system side, and at the same time, a reverse bias is applied to the first and second diodes of a high-frequency switch on the communication system side which is not selected. As a result, a composite high-frequency switch having greatly improved distortion characteristics is obtained. Therefore, since a composite high-frequency switch having greatly improved distortion characteristics is used, the distortion characteristics of a high-frequency module are greatly improved.

Furthermore, since a diplexer and high-frequency switches which define a high-frequency module are integrally provided with a multilayer substrate having a plurality of sheet layers made of ceramics layered thereon, matching adjustment between the diplexer and the high-frequency switches is facilitated, and a matching circuit for performing matching adjustment between the diplexer and the high-frequency switches is not required. Therefore, the size of the high-frequency module is reduced.

In addition, the diplexer includes an inductor and a capacitor, the high-frequency switch includes a diode, an inductor, and a capacitor. The diplexer and the high-frequency switch are provided in or mounted on a multilayer substrate, and these are connected by connections provided in the multilayer substrate. Therefore, the high-frequency module is defined by one multilayer substrate, and a greatly reduced size is obtained. In addition, loss due to wiring between components is reduced, and as a result, loss of the entire high-frequency module is greatly reduced.

Furthermore, since the lengths of the stripline electrodes which define inductors are shortened due to a wavelength shortening effect, the insertion loss of these stripline electrodes is greatly reduced. As a result, a reduced size and a reduced loss of the high-frequency module are achieved. Therefore, a reduced size and greatly improved performance of a communication apparatus in which this high-frequency module is incorporated are achieved at the same time.

Figure 10:
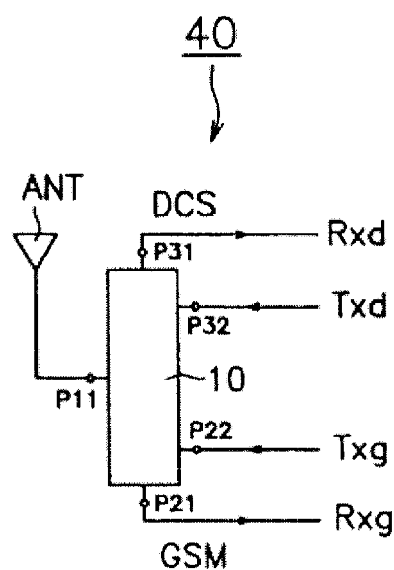
FIG. 10 is a block diagram showing a portion of the configuration of a communication apparatus using the high-frequency module of FIG. 1.

FIG. 10 is a block diagram showing a portion of the structure of a dual-band portable phone in which DCS of a 1.8-GHz band and GSM of a 900-MHz band are combined. A dual-band portable phone 40 includes an antenna 1 and a high-frequency module 10 (FIG. 1).

An antenna ANT is connected to a first terminal P11 of the diplexer 11 which is a component of the high-frequency module 10. A receiving circuit Rxg of the GSM system and a transmission circuit Txg of the GSM system are connected to the first and second terminals P21 and P22 of the high-frequency switch 12. A receiving circuit Rxg of the DCS system and a transmission circuit Txg of the DCS system are connected to the first and second terminals P31 and P32 of the high-frequency switch 13.

According to the above-described dual-band portable phone, since a composite high-frequency switch or a high-frequency module, having greatly improved distortion characteristics, is provided, the transmission and receiving characteristics of the dual-band portable phone are greatly improved.

In the above-described preferred embodiments, although a case in which approximately 0.5 V is applied to the common control terminal of a high-frequency module is described, 0 V may be applied. Since, in the case of 0 V, the common control terminal need not to extend as an external terminal on a multilayer substrate, the ease of use is greatly improved.

Furthermore, although a dual-band portable phone compatible with DCS and GSM is described, the communication apparatus is not limited to a combination of DCS and GSM. For example, the communication apparatus may be used in a combination of PCS (Personal Communications Service) and AMPS (Advanced Mobile Phone Service), a combination of DECT (Digital European Cordless Telecommunication) and GSM, or a combination of PHS (Personal Handyphone System) and PDC (Personal Digital Cellular), or may be used in a triple-band portable phone.

In addition, although the high-frequency module of FIG. 1 used in a dual-band portable phone is described, the same advantages are obtained when the high-frequency module of FIGS. 5 to 8 is used.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A composite high-frequency switch comprising:

a plurality of high-frequency switches, each including a first terminal, a second terminal, a first control terminal, a second control terminal, a first diode, a second diode, and a transmission line; wherein the composite high-frequency switch arranged such that the first terminal, the transmission line, the first diode, and the second terminal are connected in series, the first terminal side of the transmission line is connected to a ground via the second diode, the first control terminal is connected to the ground side of the second diode, and the second control terminal is connected to the second terminal side of the first diode; and at least two of the plurality of high-frequency switches are arranged such that the second control terminals are connected to each other and the connection point thereof is connected to a common control terminal via a resistor.

2. A composite high-frequency switch according to claim 1, further comprising a multilayer substrate having a plurality of sheet layers layered thereon, wherein a diode of the composite high-frequency switch is mounted on the multilayer substrate, and a transmission line of the composite high-frequency switch is provided in the multilayer substrate.

3. A high-frequency module comprising:

a composite high-frequency switch according to claim 1; and a diplexer comprising an inductor and a capacitor, the diplexer being connected to a connection point of the first diode and the transmission line of the composite high-frequency switch.

4. A high-frequency module according to claim 3, further comprising a multilayer substrate having a plurality of sheet layers layered thereon, wherein a diode of the composite high-frequency switch is mounted on the multilayer substrate, and the inductor and the capacitor of the diplexer, and a transmission line of the high-frequency switch is provided in the multilayer substrate.

5. A high-frequency module according to claim 4, wherein the capacitor of the diplexer is connected to the ground, and a grounding electrode of the composite high-frequency switch is provided between the capacitor and the transmission line of the composite high-frequency switch.

6. A communication apparatus comprising a composite high-frequency switch according to claim 1.

7. A communication apparatus comprising a high-frequency module according to claim 3.

8. A composite high-frequency switch, comprising:

a plurality of high-frequency switches, each including a first terminal, a second terminal, a first control terminal, a second control terminal, a first diode, a second diode, and a transmission line; wherein the composite high-frequency switch is arranged such that the first terminal, the transmission line, the first diode, and the second terminal are connected in series, the first terminal side of the transmission line is connected to a ground via the second diode, the first control terminal is connected to the ground side of the second diode, the second control terminal is connected to the second terminal side of the first diode; and at least two of the plurality of high-frequency switches are arranged such that the first control terminals are connected to each other and the connection point thereof is connected to a common control terminal via a resistor.

9. A composite high-frequency switch according to claim 8, further comprising a multilayer substrate having a plurality of sheet layers layered thereon, wherein a diode of the composite high-frequency switch is mounted on the multilayer substrate, and a transmission line of the high-frequency switch is provided in the multilayer substrate.

10. A high-frequency module comprising:

a composite high frequency switch according to claim 8;

a diplexer comprising an inductor and a capacitor, the diplexer being connected to a connection point of the first diode and the transmission line of the composite high-frequency switch.

11. A high-frequency module according to claim 10, further comprising a multilayer substrate having a plurality of sheet layers layered thereon, wherein a diode of the composite high-frequency switch is mounted on the multilayer substrate, and the inductor and the capacitor of the diplexer, and a transmission line of the composite high-frequency switch is provided the multilayer substrate.

12. A high-frequency module according to claim 11, wherein the capacitor of the diplexer is connected to the ground, and a grounding electrode of the composite high-frequency switch is provided between the capacitor and the transmission line of the composite high-frequency switch.

13. A communication apparatus comprising a composite high-frequency switch according to claim 8.

14. A communication apparatus comprising a composite high-frequency module according to claim 10.

15. A composite high-frequency switch, comprising:

a plurality of high-frequency switches each having a first terminal, a second terminal, a first control terminal, a second control terminal, a first diode, a second diode, and a transmission line; wherein the composite high-frequency switch is arranged such that the first terminal, the transmission line, the first diode, and the second terminal are connected in series, the first terminal side of the transmission line is connected to a ground via the second diode, the first control terminal is connected to the ground side of the second diode, the second control terminal is connected to the second terminal side of the first diode; and at least two of the plurality of high-frequency switches are arranged such that the first control terminal of a first of the high-frequency switches and the second control terminal of a second of the high-frequency switches are connected to each other and the connection point thereof is connected to a common control terminal via a resistor.

16. A composite high-frequency switch according to claim 15, further comprising a multilayer substrate having a plurality of sheet layers layered thereon, wherein a diode of the composite high-frequency switch is mounted on the multilayer substrate, and a transmission line of the composite high-frequency switch is provided in the multilayer substrate.

17. A high-frequency module comprising:

a composite high-frequency switch according to claim 15;

a diplexer comprising an inductor and a capacitor, the diplexer being connected to a connection point of the first diode and the transmission line of the composite high-frequency switch.

18. A high-frequency module according to claim 17, further comprising a multilayer substrate having a plurality of sheet layers layered thereon, wherein a diode of the composite high-frequency switch is mounted on the multilayer substrate, and the inductor and the capacitor of the diplexer, and a transmission line of the high-frequency switch is provided in the multilayer substrate.

19. A high-frequency module according to claim 18, wherein the capacitor of the diplexer is connected to the ground, and a grounding electrode of the composite high-frequency switch is provided between the capacitor and the transmission line of the high-frequency switch.

20. A communication apparatus comprising a composite high-frequency switch according to claim 15.

21. A communication apparatus comprising a high-frequency module according to claim 17.

* * * * *